US 6,542,164 B2

(12) United States Patent
Graham (10) Patent No.: US 6,542,164 B2
(45) Date of Patent: *Apr. 1, 2003

(54) TIMING AND VELOCITY CONTROL FOR DISPLAYING GRAPHICAL INFORMATION

(75) Inventor: Christopher E. Graham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,479

(22) Filed: Jun. 12, 2001

(65) Prior Publication Data

US 2002/0054013 A1 May 9, 2002

Related U.S. Application Data (63) Continuation of application No. 08/873,855, filed on Jun. 12, 1997, now Pat. No. 6,281,879, which is a continuation of application No. 08/709,529, filed on Sep. 6, 1996, now abandoned, which is a continuation of application No. 08/260,558, filed on Jun. 16, 1994, now abandoned.

(51) Int. Cl.⁷ ................................................ G09G 5/00
(52) U.S. Cl. ........................................ 345/711; 345/157
(58) Field of Search ................................ 345/157, 159, 345/156, 160, 856, 859, 711, 715

(56) References Cited

U.S. PATENT DOCUMENTS

| | | | |
|---|---|---|---|
| 4,789,962 A | 12/1988 | Berry et al. | 364/900 |
| 4,984,152 A | 1/1991 | Muller | 364/200 |
| 5,140,678 A * | 8/1992 | Torres | |
| 5,155,806 A | 10/1992 | Hoeber et al. | 395/157 |
| 5,157,768 A | 10/1992 | Hoeber et al. | 395/157 |
| 5,169,342 A | 12/1992 | Steele et al. | 434/112 |
| 5,196,838 A | 3/1993 | Meier et al. | 340/724 |
| 5,287,448 A * | 2/1994 | Nicol | |
| 5,299,307 A * | 3/1994 | Young | 345/157 |
| 5,546,521 A * | 8/1996 | Martinez | |

OTHER PUBLICATIONS

Macintosh Reference, Apple Computer Inc, pp. 30–31, 1991.*

Quick Result, Microsoft Word, Version 6.0, 1993, pp. 39–40 and 154–155.*

* cited by examiner

Primary Examiner—Chanh Nguyen
(74) Attorney, Agent, or Firm—Merchant & Gould P.C.

(57) ABSTRACT

Time and velocity metrics are used to control when information about a graphical object to which a cursor points is displayed on a video display. The time metric is used to ensure that a non-negligible amount of time passes between the time at which the cursor initially points to the graphical object and the time at which the information about the graphical object is displayed on the video display. The time delay helps to eliminate such information being displayed inadvertently when the user quickly passes the cursor over graphical objects in the video display. In addition, the timing control facilitates the shortening of the delay when it appears that the user wishes to browse amongst several related graphical objects that are shown in the video display. For example, when it appears that the user wishes to browse tools on the tool bar, the delay is shortened. The velocity metric is used to determine the likelihood that the user intended to point to the graphical object and serves to minimize instances where undesired information about the graphical object is displayed.

30 Claims, 7 Drawing Sheets

TIMING AND VELOCITY CONTROL FOR DISPLAYING GRAPHICAL INFORMATION

RELATED APPLICATIONS

This is a continuation of U.S. patent application Ser. No. 08/873,855, filed Jun. 12, 1997, now U.S. Pat. No. 6,281,879, which is a continuation of U.S. patent application Ser. No. 08/709,529, filed Sep. 6, 1996, now abandoned, which is a File Wrapper Continuation of U.S. patent application Ser. No. 08/260,558, filed Jun. 16, 1994, now abandoned, which applications are incorporated herein by reference.

TECHNICAL FIELD

The present invention relates generally to data processing systems and, more particularly, to the displaying of graphical information in data processing systems.

BACKGROUND OF THE INVENTION

Many conventional application programs utilize tool bars. Tool bars provide the user with a number of tools that assist the user in performing tasks. Typically, a separate control is provided for each tool on the tool bar. The control may be a pushbutton or another graphical object that allows the user to invoke the desired tool. Often times the controls on the tool bar have icons on their faces that indicate the nature of the tool. Unfortunately, as the typical number of controls on the tool bar has grown for applications, it has become more and more difficult for the user to discern the nature of the tool solely from the icons shown as part of the tool bar. As such, many users have difficulty using the tools on the tool bar.

SUMMARY OF THE INVENTION

The limitations of the prior art are overcome by the present invention. In accordance with a first aspect of the present invention, a method is practiced in a data processing system having a video display for displaying a cursor that points to positions on the video display. The data processing system also includes an input device for manipulating the cursor. In accordance with this method, it is first determined that the cursor points to a position within a region on the video display. A velocity metric of the cursor is measured. Where the velocity metric does not exceed a predetermined threshold value, an event is triggered. On the other hand, where the velocity metric exceeds the predetermined threshold value, the event is inhibited.

In accordance with a second aspect of the present invention, it is determined that a cursor points to a position within a region on the video display. A time period metric that specifies how long the cursor has remained pointing within the region is measured. A velocity metric of the cursor within the region is also measured. Based upon these metrics, a determination is made whether to trigger an event.

In accordance with an additional aspect of the present invention, a method is practiced in a data processing system having a video display for displaying a cursor that points to positions in the video display and an input device for manipulating the cursor. In accordance with this method, a graphical object is displayed on the video display. The user uses the input device, and in response, the data processing system positions the cursor to point at the graphical object. A predetermined period of time, such as a time greater than 0.4 seconds, is allowed to pass and then a determination is made whether the cursor still points at the graphical object. If it is determined that the cursor still points at the graphical object, information about the graphical object is displayed adjacent to the graphical object on the video display.

In accordance with another aspect of the present invention, a method is practiced wherein a tool bar having tools is displayed on the video display. When the user uses the input device, the cursor is position to point at a selected one of the tools on the tool bar. The system waits a predetermined non-negligible amount of time. The system also measures a velocity metric of the cursor within the first graphical object. If the cursor still points at the selected tool after waiting the predetermined non-negligible amount of time and the velocity metric has remained below a predetermined threshold during the predetermined non-negligible amount of time, information about the selected tool is displayed in the video display. The position is adjacent to the selected tool.

In accordance with a further aspect of the present invention, a method is practiced in a computer system having a video display for displaying a cursor that points to positions on the video display and an input device for moving the cursor on the video display. In this method, a first graphical object is displayed on the video display. In response to the user using the input device, the cursor is positioned to point at the first graphical object. The system waits a non-negligible predetermined amount of time. A determination is made whether the cursor still points at the graphical object after the non-negligible predetermined amount of time has passed. Where the cursor still points at the first graphical object, a number of steps are performed. These steps include displaying information about the first graphical object adjacent to the first graphical object of the video display. The non-negligible predetermined amount of time is then reset to a substantially shorter amount of time. A second graphical object is displayed on the video display and, in response to the user using the input device, the cursor is positioned to point at the second graphical object on the video display. The system waits the substantially shorter amount of time. Where the cursor is still pointing at the second graphical object after waiting the substantially shorter period of time, information about the second graphical object is displayed adjacent to the second graphical object on the video display.

In accordance with a still further aspect of the present invention, a data processing system includes a video display for displaying video data. The video display displays a first graphical object and a cursor that points to the first graphical object. An input device is included in this part of the data processing system for moving the cursor on the video display. A message generator is provided for displaying information about the first graphical object. The information is displayed adjacent to the first graphical object on the video display when the cursor remains pointing at the first graphical object for a predetermined non-negligible amount of time. The message generator includes a comparator and a message source. The comparator determines whether the cursors remain pointing at the first graphical object for the predetermined non-negligible amount of time. The message source provides and displays information about the first graphical object adjacent to the first graphical object on the video display when the comparator determines that the cursor has remained pointing at the first graphical object for the specified amount of time.

DETAILED DESCRIPTION OF THE INVENTION

The preferred embodiment of the present invention displays a tool tip when a mouse cursor points to a tool or a tool bar for a sufficient amount of time and the magnitude of the velocity of the mouse cursor remains below a predetermined threshold. A tool tip is a brief textual message, such as a name of a tool, that identifies the nature of the tool. The preferred embodiment of the present invention provides a delay between when the mouse cursor is initially positioned to point at the tool control on the tool bar and when the tool tip is displayed. This delay prevents the user from receiving undesired tool tips when the user inadvertently passes the mouse cursor over a control on the tool bar. The delay is sufficiently long (i.e., it is non-negligible) to allow the user to move the mouse cursor if he does not want to receive a tool tip. The delay is shortened when an initial tool tip is displayed so as to allow the user to quickly browse the tool controls that are available on the tool bar. The magnitude of the velocity of the mouse cursor is measured to determine whether the user likely intends to point at the tool to receive a tool tip or whether the user, instead, is merely passing over the tool while moving to another destination.

Although the preferred embodiment of the present invention concerns controlling when tool tips for tools on a tool bar are displayed, those skilled in the art will appreciate that the present invention may generally be applied to other regions of a video display (such as other types of graphical objects) for which graphical information is to be provided. It should be appreciated that the present invention may be applied to both visible and invisible graphical objects.

Figure 1:
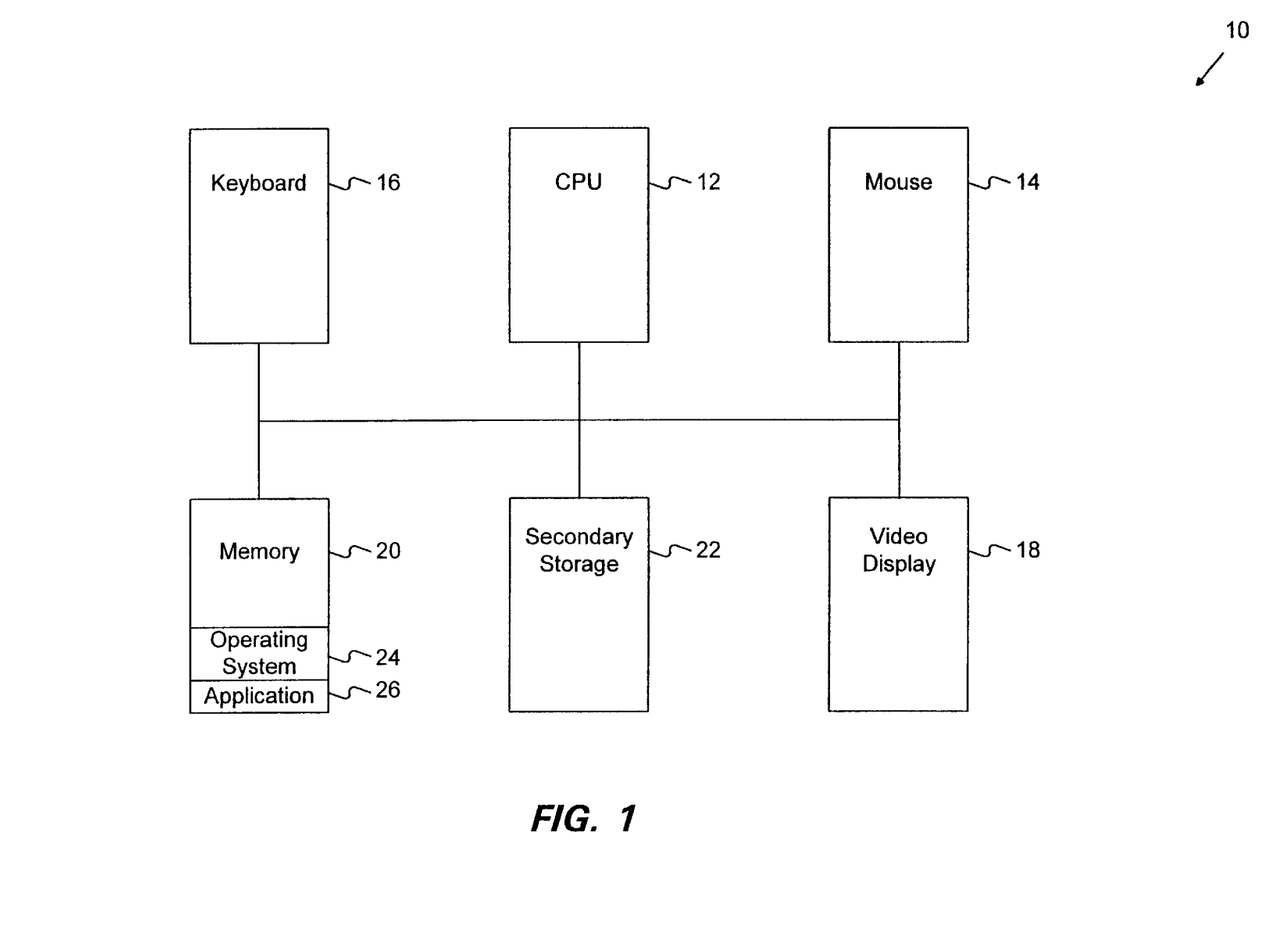
FIG. 1 is a block diagram of a data processing system that is suitable for practicing a preferred embodiment of the present invention.

FIG. 1 is a block diagram of a data processing system 10 that is suitable for practicing the preferred embodiment of the present invention. The data processing system 10 includes at least one central processing unit (CPU) 12. The CPU 12 is connected to a number of peripheral devices, including a mouse 14, a keyboard 16 and a video display 18. The CPU 12 is also connected to a memory 20 and a secondary storage device 22, such as a hard disk drive. The memory 20 holds a copy of an operating system 24, such as the Microsoft Windows, version 3.1, operating system sold by Microsoft Corporation of Redmond, Wash. The memory 20 also holds a copy of an application program 26. The implementation of the preferred embodiment of the present invention will be described below with reference to use of tool tips within the application program 26. Nevertheless, it should be appreciated that the tool tips may alternatively be implemented in the operating system 24 or as a system resource.

Figure 2A:
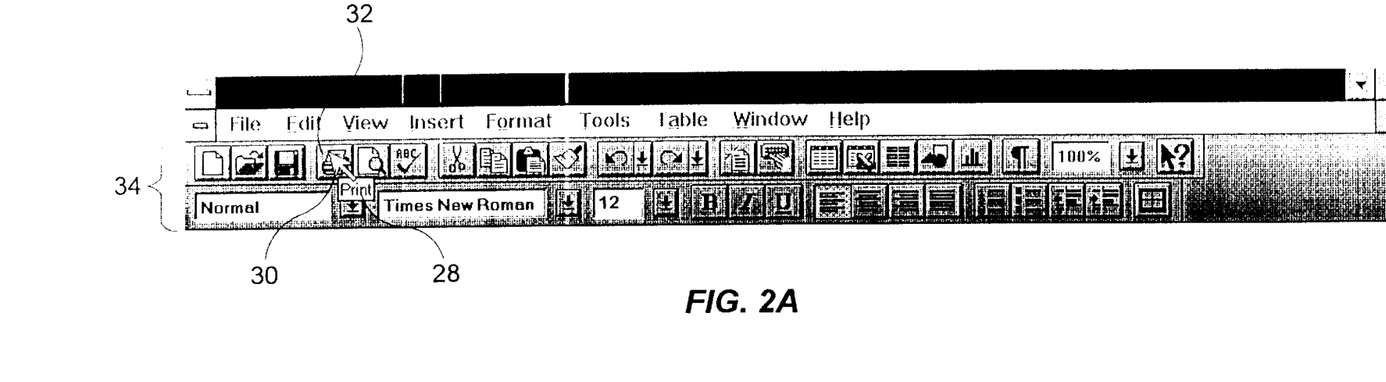
FIG. 2A is a diagram illustrating a tool bar and a tool tip that is provided for a print button in accordance with the preferred embodiment of the present invention.

FIG. 2A shows the tool bar 34 that is generated and displayed on the video display 18 when the application program 26 is run on the CPU 12. The tool bar 34 includes a number of controls, such as buttons and list boxes, that enable a user to access the tools of the tool bar. When the user positions a mouse cursor 30 over one of the buttons and clicks the mouse (i.e., quickly depresses and releases a predefined one of the mouse buttons), the tool associated with the button is invoked. Similarly, by positioning the mouse cursor 30 over one of the buttons of the list boxes, a drop-down list appears, and the user may select one of the options on the drop-down list using the mouse 14.

The tool bar 34 is created as a window by the application program 26. The operating system 24 facilitates the definition of such windows (as is provided in the Microsoft Windows, version 3.1, operating system). FIG. 2A shows the mouse cursor 30 pointing to a print button 32 on the tool bar 34. When a user positions the mouse cursor 30 over the print button 32 and clicks the mouse button, the document currently displayed in the window of the application program is printed.

The user interface provided for the application program 24 is logically divisible into a number of windows. One of these windows is the tool bar 34. In general, each window of the user interface has a separate window procedure associated with it. The operating system 24 maintains a message queue for each program that generates windows. Accordingly, the application program 26 has its own message queue. Since the application program 26 may generate multiple windows, the message queue may hold messages for multiple windows. When an event occurs, the event is translated into a message that is put into the message queue for the application program 26. The application program 26 retrieves and delivers the message to the proper windows by executing a block code known as the "message loop." The window procedure that receives the message then processes the message.

Movements of the mouse 14 are reflected in messages that are placed into the message queue of the application program 26. In particular, when a user positions the mouse cursor 30 with the mouse 14 over a window or clicks the mouse by depressing one of the mouse buttons within a window, the procedure for the window receives a mouse message. The operating system 24 provides a number of predefined mouse messages. The mouse messages specify the status of mouse buttons and the position of the mouse cursor 30 within the window. The position of the mouse cursor 30 within the window is specified in (X, Y) coordinates relative to the upper left-hand corner of the window. Thus, when the mouse cursor 30 moves within the tool bar 34, the position of the mouse cursor 30 within the tool bar is reflected and a mouse message that specifies (X, Y) coordinates of the mouse cursor relative to the upper left-hand corner of the tool bar. The window procedure receives the mouse message and utilizes the information contained in the message to respond to the mouse 14 activities.

As mentioned above, the application program 26 specifies the window that constitutes the tool bar 34. The application program 26 paints each of the controls, including print button 32, at known locations within the window of the tool bar 34. When the mouse cursor 30 is positioned within the tool bar, mouse messages specify the position of the mouse cursor within the tool bar 34. The mouse messages are sent to the window procedure that is responsible for the tool bar window. The window procedure for the tool bar 34 compares the coordinates specified by the mouse message with the known location of the controls within the tool bar. Accordingly, the window procedure for the tool bar 34 can determine whether the mouse cursor 30 is pointing at any of the controls. When it is determined that the mouse cursor 30 is pointing at one of the controls of the tool bar 34, a tool tip 28 may be displayed if the mouse cursor 30 has remained pointing at the control for a sufficient period of time and the magnitude of the velocity of the mouse cursor is below a predetermined threshold. Hence, in the example shown in FIG. 2A, the message "Print" is displayed as a tool tip 28, given that the mouse cursor 30 is pointing to the print button 32.

Figure 2B:
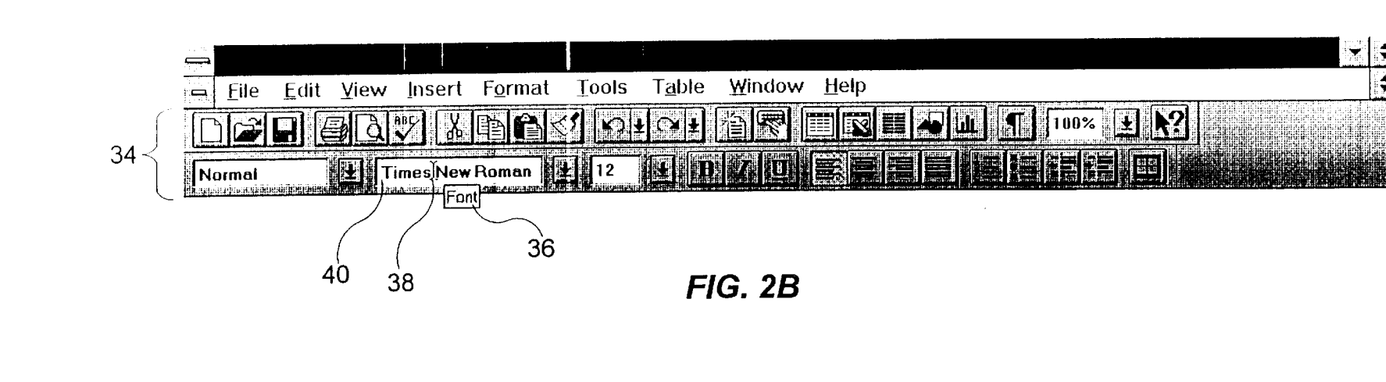
FIG. 2B is a diagram illustrating a tool bar and a tool tip that is provided for a font list box in accordance with the preferred embodiment of the present invention.

Tool tips are provided not only for buttons on the tool bar 34 but are also provided for other types of controls. For example, as shown in FIG. 2B, a mouse cursor 38 points to a portion of a list box 40 that concerns the font which the user wishes to utilize. Accordingly, a tool tip 36 is displayed that includes the text "Font". It is worth noting that the mouse cursor 38 changes from an arrow to a cross bar, since the cursor points to a portion of a list box that contains text rather than a button as in FIG. 2A.

Tool tips are displayed using text output commands that are provided by the operating system 24. Specifically, the ExtTextOut( ) function that is provided by the Microsoft Windows, version 3.1, operating system is used in the preferred embodiment. The format of this function is as follows:

FIG. 2A) is positioned over one of the controls of the tool bar 34, a sufficient time has elapsed and the measured magnitude of the velocity of the mouse cursor 30 is below a predetermined threshold, the procedure determines the string that is to be displayed in the tool tip for the control to which the mouse cursor points. The address of this string is passed as the lpszString parameter to the ExtTextOut( ) function. This function then proceeds to draw the tool tip.

As the rectangle for the tool tip is a clipped rectangle, the background color may be specified. In the preferred embodiment of the present invention, the background color is yellow, as specified in red/green/blue (RG3) coordinates as (255, 255, 128). The size of the rectangle used for the tool tip is as follows: height equals the height of the text as specified by the font (i.e., the point of the font) plus 4, and length equals length of the text plus 4.

The tool tips are displayed at predefined locations relative to the controls. In general, tool tips are displayed centered under edit boxes and combo boxes and displayed relative to tool bar buttons at a position where the upper left-hand corner of the tool tip rectangle is 2 pixels to the left of the top left corner of the button and 15 pixels below the hot spot of the mouse 14. Those skilled in the art will appreciate that tool tips may be displayed at other locations that are adjacent to the tools.

Figure 3A:
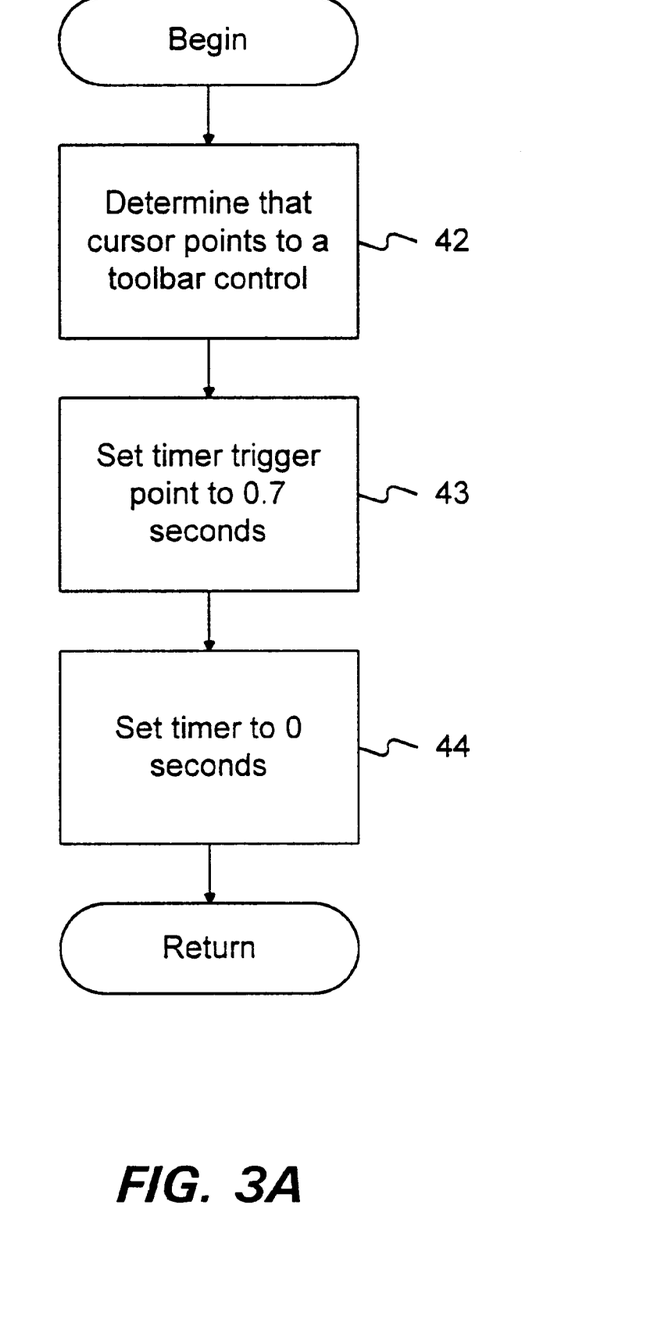
FIG. 3A is a flow chart illustrating the steps performed to initially set a timer when a cursor is positioned over a control on the tool bar in accordance with the preferred embodiment of the present invention.

The discussion will now focus on the controls for determining when to display the tool tip. When the mouse cursor 30 is initially positioned to point to a tool bar control (i.e., the first time that the mouse cursor points to a control while it has been in the tool bar 34), the steps shown in FIG. 3A are performed. Initially, the window procedure for the tool bar 34 determines that the mouse cursor 30 points to a tool bar control (step 42 in FIG. 3A). The application program 26 uses a timer to determine whether or not to display a tool tip. This timer may be a system-provided resource that is

```
BOOL ExtTextOut(hdc, nXStart, nYStart, fuOptions, lprc, lpszString, cbString, lpDx)
HDC hdc;                  /* handle of device context                */
int nXStart;              /* x-coordinate of starting position       */
int nYStart;              /* y-coordinate of starting position       */
UINT fuOptions;           /* rectangle type                          */
const RECT FAR* lprc;     /* address of structure with rectangle     */
LPCSTR lpszString;        /* address of string                       */
UINT cbString;            /* number of bytes in string               */
int FAR* lpDx;            /* spacing between character cells         */
```

The hdc parameter of this function specifies a handle (i.e., a numerical identifier) for a device context. In this case, the device context specifies attributes that determine how the operating system interacts with the video display 18. The nXStart parameter specifies the logical X coordinate at which the string of the tool tip message begins. Similarly, the nYStart parameter specifies the logical Y coordinate at which the string begins. The fuOptions parameter specifies the type of rectangle for the tool tip. The operating system 24 provides predefined data structures that specify rectangle types. In this case, the rectangle type is defined as a clipped rectangle. The lprc parameter is a pointer to a structure that holds a rectangle and the lpszString is a pointer to a structure that holds the textual string to be displayed in the tool tip. The cbString parameter specifies the number of bytes in the string and the lpDx parameter specifies spacing between character cells.

When the window procedure for the tool bar 34 receives a mouse message that indicates that the mouse cursor 30 (see provided by the operating system 24 or may be a separate component that is provided by the application program 26. The tip is displayed when the timer counts up to a preset trigger point and the magnitude of the velocity of the mouse cursor is an acceptable range. The timer trigger point is then set to 0.7 seconds (step 43 in FIG. 3A). Those skilled in the art will appreciate that the choice of 0.7 seconds is not intended to be limiting of the present invention; rather, 0.7 seconds is a value used in the preferred embodiment of the present invention, which appears to empirically produce desirable results. The timer is then reset to zero seconds so that it can begin counting time.

Figure 3B:
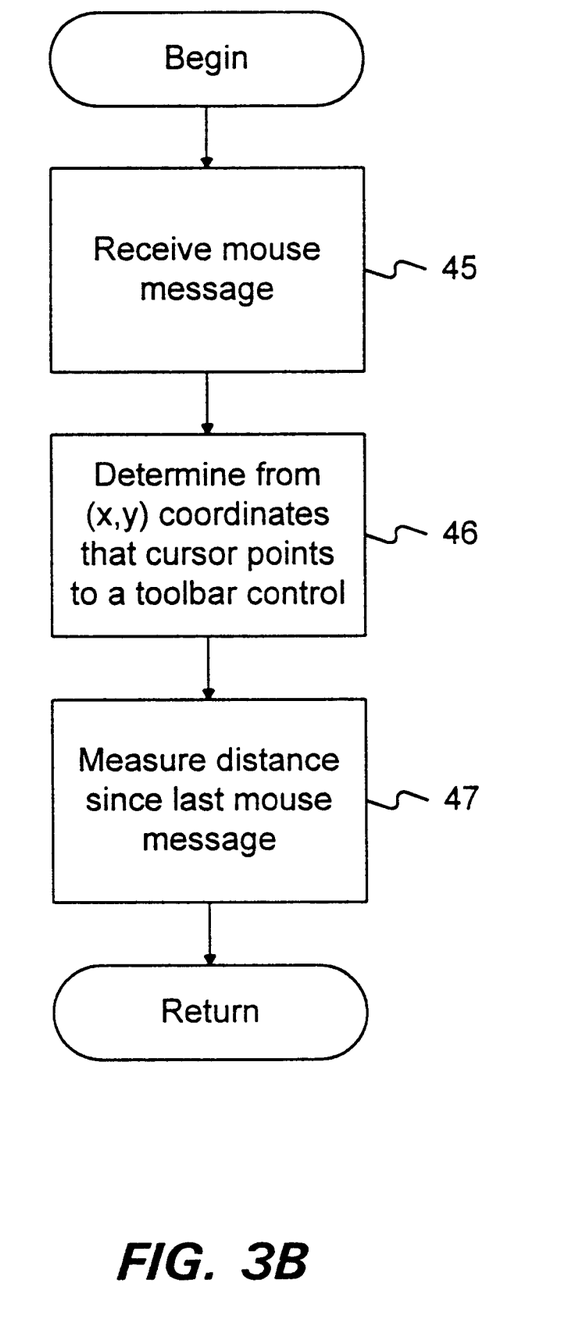
FIG. 3B is a flow chart illustrating the steps performed to determine the magnitude of the velocity of the cursor when the cursor is positioned over a control on the tool bar in accordance with the preferred embodiment of the present invention.

As mentioned above, the magnitude of the velocity of the mouse cursor 30 is also used to control whether a tool tip is displayed. FIG. 3B shows the steps that are performed to determine the magnitude of velocity of the mouse cursor 30. Initially, a mouse message is received (step 45). As discussed above, the mouse message includes the (X, Y) coordinates that specify the most recent position of the mouse cursor 30. The coordinates are utilized to determine whether the mouse cursor 30 points to a tool bar control (step 46). As was discussed above, the system knows the locations of the tool bar controls within the tool bar 34. This knowledge is used to determine whether the cursor points to a tool bar control. Mouse messages are generated periodically as the mouse cursor position changes. The time interval between mouse messages is reasonably fixed. Hence, the magnitude of the velocity of the mouse cursor 30 may be determined by comparing the (X, Y) coordinates for the most recently received mouse message with the coordinates from the last previous mouse message. The Euclidean distance between these two sets of coordinates may be calculated and, since the time interval is known, the magnitudes of velocity can then be calculated. However, since the time interval is fixed, there is no need to calculate the magnitude of velocity in each instance; rather, the measure of the distance traveled quantifies the magnitude of the velocity of the mouse cursor 30. Accordingly, the preferred embodiment of the present invention merely measures the distance in pixels since the last mouse message as the velocity metric (step 47).

Those skilled in the art will appreciate that in alternative embodiments, the present invention may use the magnitude of the velocity as the measure that must exceed a predetermined empirically derived threshold. Alternatively, the vector value of the velocity may be utilized and compared to a vector threshold to determine whether a tool tip should be displayed or not. Moreover, those skilled in the art will appreciate that mouse cursor velocity may be used alone to determine whether a tool tip is displaced or, as employed in the preferred embodiment of the present invention, may be used in conjunction with time metrics to determine whether to display a tool tip or not. In addition, it should be realized that the controls described herein may be applied more broadly to any events that are triggered by measuring the time and velocity variables or velocity variable alone of a mouse cursor within a region of a user interface.

Figure 4:
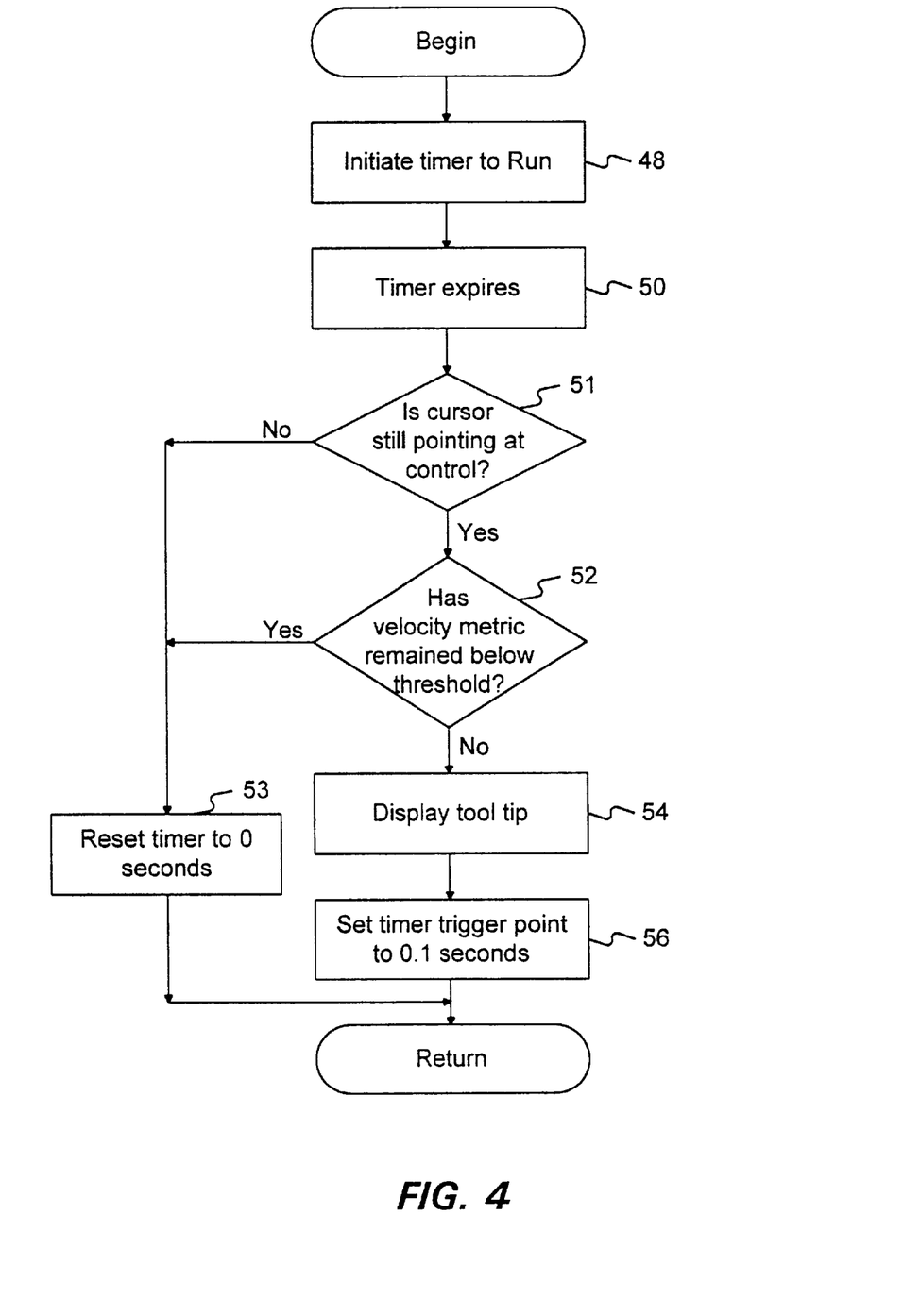
FIG. 4 is a flow chart illustrating the steps performed to determine whether a tool tip is to be displayed in the preferred embodiment of the present invention.

Whenever the mouse cursor 30 is positioned to point to a control within the tool bar 34 of the application program 26, the steps shown in FIG. 4 are performed. Initially, the timer is initiated to run (step 48). When the timer expires (step 50), a determination is made whether the mouse cursor 30 is still pointing at the same control on the tool bar 34 (step 51 in FIG. 4) and whether the measured velocity metric has remained below an empirically derived threshold value during the time period (step 52). If both of these conditions are met, a tool tip is displayed as discussed above (step 54 in FIG. 4). In an alternative embodiment, the velocity metric is only measured as the timer expires rather than during the entire time interval. In addition to the tool tip being displayed, the timer trigger point is set to 0.1 seconds (step 56). The setting of the timer trigger point to a shorter duration (e.g., 0.1 seconds) facilitates browsing, so that the tool tips will be more quickly displayed when the user moves to an adjacent button or other control on the tool bar 34. If either of the conditions is not met, a tool tip is not displayed and the timer is reset to 0 seconds (step 53).

The time duration for which the mouse cursor 30 remains pointing at a tool bar control and the measured magnitude of the velocity of the mouse cursor provide helpful indicators of the intent of the user. Empirical tests indicate that users typically will leave the mouse cursor pointing at a control for a time period greater than 0.7 seconds if they wish to use the control. Similarly, users tend to move the mouse cursor slowly over a tool bar control when they wish to utilize the tool bar control. In contrast, when users do not wish to use a tool bar control and are merely passing over a tool bar control, the users move the mouse cursor with a sufficient magnitude of velocity to indicate their intent.

Figure 5:
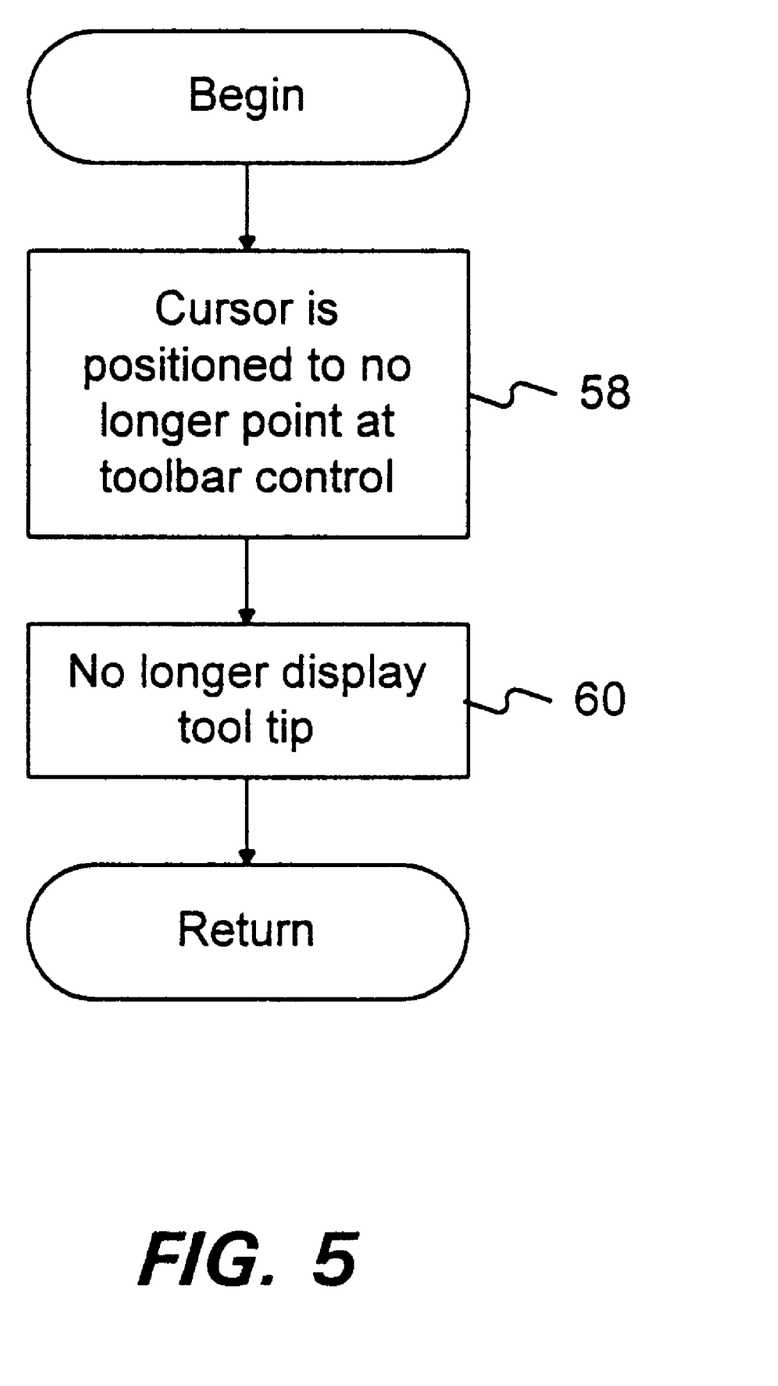
FIG. 5 is a flow chart illustrating the steps performed when a cursor no longer points within the tool bar in the preferred embodiment of the present invention.

FIG. 5 is a flow chart illustrating the steps performed when a mouse cursor is positioned to no longer point at a tool bar control (step 58). As soon as the cursor no longer points at the tool bar control, the tool tip is no longer displayed (step 60).

Figure 6:
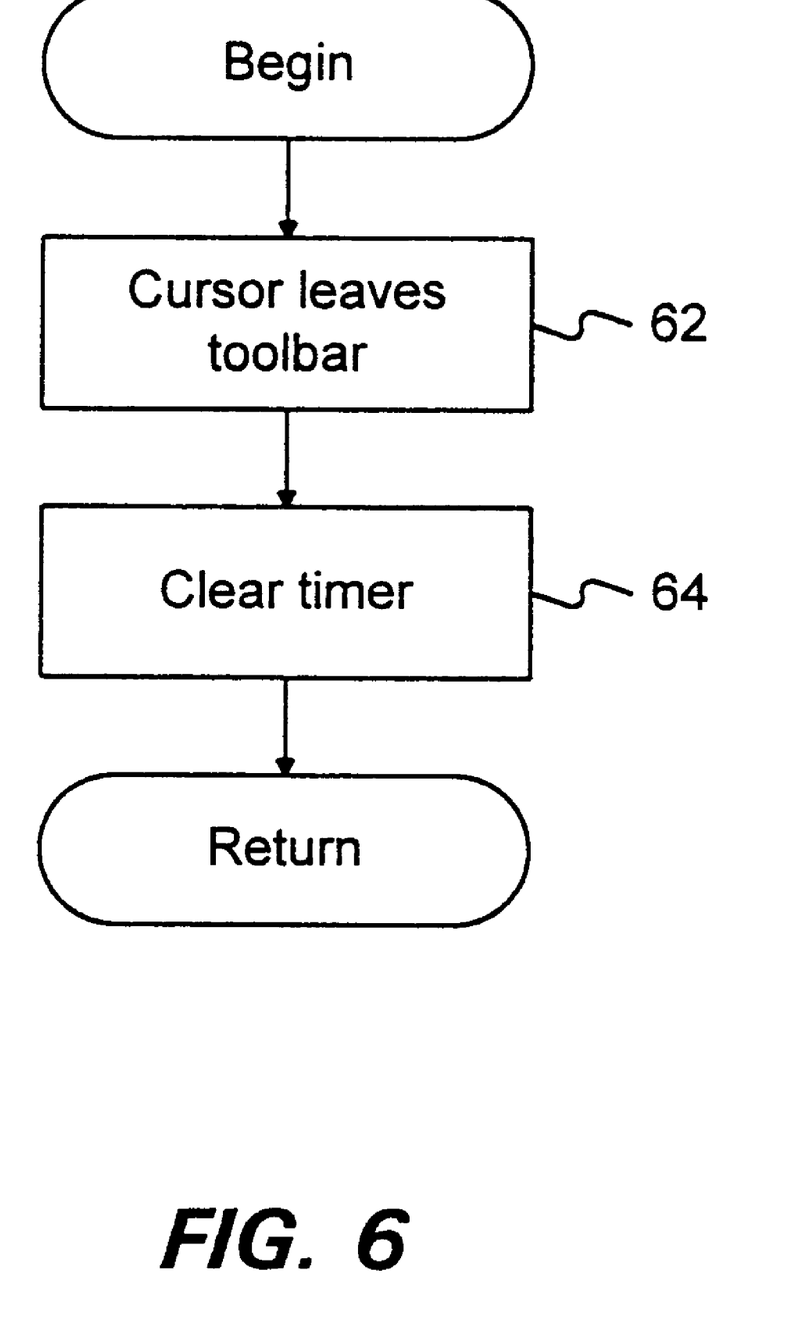
FIG. 6 is a low chart illustrating the steps that are performed relative to the timer when the cursor leaves the tool bar in the preferred embodiment of the present invention.

When the mouse cursor is positioned so as to no longer point within the tool bar, the steps shown in FIG. 6 are performed. In particular, when the cursor leaves the tool bar (step 62), the timer is cleared (step 64). The clearing of the timer allows the processing to be reinitiated when the cursor again returns to point to a location within the tool bar.

While the present invention has been described with reference to a preferred embodiment thereof, those skilled in the art will appreciate that various changes in form and detail may be made without departing from the intended scope of the present invention as defined in the appended claims. For example, the timing control described above relative to the preferred embodiment of the present invention may also be applied to graphical objects other than tools on a tool bar. Moreover, the timing parameters utilized by the preferred embodiment of the present invention are intended to merely illustrative. Other timing parameters may be utilized as well. Still further, pointing devices other than the mouse may be used to position the cursor.

What is claimed is:

1. A method of displaying information about a graphical object displayed on a video display, the method comprising:

determining that a cursor is positioned to point at the graphical object on the video display;

setting a first trigger point representing a predetermined period of time, the predetermined period of time being greater than an interval between two consecutive mouse location events;

determining expiration of the predetermined period of time represented by the first trigger point responsive to the operation of determining that the cursor is positioned to point at the graphical object; and displaying the information adjacent to the graphical object on the video display, responsive to the operation of determining expiration of the predetermined period of time.

2. The method of claim 1 wherein the operation of determining that a cursor is positioned to point at the graphical object comprises:

receiving a message notification indicating that the cursor is positioned to point at the graphical object on the video display.

3. The method of claim 1 wherein the operation of setting the first trigger point comprises:

initiating a timer to count for the predetermined period of time represented by the first trigger point.

4. The method of claim 3 wherein the operation of determining expiration of the predetermined period of time comprises:

determining that the timer has counted for the predetermined period of time.

5. The method of claim 4 further comprising:

clearing the timer if the cursor is no longer positioned to point at the graphical object before the timer expires.

6. The method of claim 4 further comprising:

clearing the timer if the cursor is moved before the timer expires.

7. The method of claim 1 wherein the displaying operation comprises;
 determining a position of the cursor after the predetermined period of time expires;
 determining whether the position of the cursor is over the graphical object on the video display, responsive to the operation of determining the position of the cursor, and
 displaying on the video display the information about the graphical object at a predefined location relative to the graphical object.

8. The method of claim 1 further comprising:
 terminating display of the information if the cursor no longer points at the graphical object on the video display, after the displaying operation.

9. The method of claim 1 further comprising:
 determining movement of the cursor to point at a different graphical object displayed on the video display;
 setting a second trigger point representing a shorter period of time than the predetermined period of time, responsive to the operation of displaying the information adjacent to the different graphical object on the video display;
 detecting expiration of the shorter period of time representing the second trigger point, responsive to the operation of determining movement of the cursor to point at the different graphical object; and
 displaying the information adjacent to the different graphical object on the video display, responsive to the operation of detecting expiration of the shorter period of time.

10. The method of claim 1 further comprising:
 determining the information to be displayed about the graphical object, responsive to the operation of determining expiration of the predetermined period of time.

11. A method of displaying information about a control displayed on a video display, the method comprising:
 determining that a cursor is positioned to point at the control on the video display;
 waiting a predetermined period of time, the predetermined period of time being greater than an interval between two consecutive mouse location events;
 receiving notification that the predetermined period of time has expired; and
 displaying the information adjacent to the control on the video display, if the cursor is still positioned to point at the control after expiration of the predetermined period of time.

12. The method of claim 11 wherein the operation of displaying the information comprises:
 displaying text about the control adjacent to the control on the video display.

13. The method of claim 11 wherein the control includes a button control.

14. The method of claim 11 wherein the control includes a list box control.

15. The method of claim 11 wherein the operation of displaying the information comprises:
 determining a velocity of the cursor over the control; and
 displaying the information adjacent to the control on the video display, if the cursor is still positioned to point at the control after expiration of the predetermined period of time and the velocity remains below a predetermined threshold.

16. A computer program storage medium readable by a computer system and encoding a computer program for executing a computer process for displaying information about a graphical object displayed on a video display, the computer process comprising:
 determining that a cursor is positioned to point at the graphical object on the video display;
 setting a first trigger point representing a predetermined period of time, the predetermined period of time being greater than an interval between two consecutive mouse location events;
 determining expiration of the predetermined period of time represented by the first trigger point, responsive to the operation of determining that the cursor is positioned to point at the graphical object; and
 displaying the information adjacent to the graphical object on the video display, responsive to the operation of determining expiration of the predetermined period of time.

17. The computer program storage medium of claim 16 wherein the operation of determining that a cursor is positioned to point at the graphical object comprises:
 receiving a message notification indicating that the cursor is positioned to point at the graphical object on the video display.

18. The computer program storage medium of claim 16 wherein the operation of setting the first trigger point comprises:
 initiating a timer to count for the predetermined period of time represented by the first trigger point.

19. The computer program storage medium of claim 18 wherein the operation of determining expiration of the predetermined period of time comprises:
 determining that the timer has counted for the predetermined period of time.

20. The computer program storage medium of claim 19 wherein the computer process further comprises:
 clearing the timer if the cursor is no longer positioned to point at the graphical object before the timer expires.

21. The computer program storage medium of claim 19 wherein the computer process further comprises:
 clearing the timer if the cursor is moved before the timer expires.

22. The computer program storage medium of claim 16 wherein the displaying operation comprises;
 determining a position of the cursor after the predetermined period of time expires;
 determining whether the position of the cursor is over the graphical object on the video display, responsive to the operation of determining the position of the cursor; and
 displaying on the video display the information about the graphical object at a predefined location relative to the graphical object.

23. The computer program storage medium of claim 16 wherein the computer process further comprises:
 terminating display of the information if the cursor no longer points at the graphical object on the video display, after the displaying operation.

24. The computer program storage medium of claim 16 wherein the computer process further comprises:
 determining movement of the cursor to point at a different graphical object displayed on the video display;
 setting a second trigger point representing a shorter period of time than the predetermined period of time, responsive to the operation of displaying the information adjacent to the different graphical object on the video display;

determining expiration of the shorter period of time representing the second trigger point, responsive to the operation of determining movement of the cursor to point at the different graphical object; and displaying the information adjacent to the different graphical object on the video display, responsive to the operation of determining expiration of the shorter period of time.

25. The computer program storage medium of claim 16 wherein the computer process further comprises:

determining the information to be displayed about the graphical object, responsive to the operation of detecting expiration of the predetermined period of time.

26. A computer program storage medium readable by a computer system and encoding a computer program for executing a computer process for displaying information about a graphical object displayed on a video display, the computer process comprising:

detecting a cursor positioned to point at the control on the video display;

waiting a predetermined period of time, the predetermined period of time being greater than an interval between two consecutive mouse location events;

receiving notification that the predetermined period of time has expired; and displaying the information adjacent to the control on the video display, if the cursor is still positioned to point at the control after expiration of the predetermined period of time.

27. The computer program storage medium of claim 26 wherein the operation of displaying the information comprises:

displaying text about the control adjacent to the control on the video display.

28. The computer program storage medium of claim 26 wherein the control includes a button control.

29. The computer program storage medium of claim 26 wherein the control includes a list box control.

30. The computer program storage medium of claim 26 wherein the operation of displaying the information comprises:

detecting a velocity of the cursor over the control; and displaying the information adjacent to the control on the video display, if the cursor is still positioned to point at the control after expiration of the predetermined period of time and the velocity remains below a predetermined threshold.

* * * * *